(12) United States Patent
Al-Quraishi

(10) Patent No.: US 7,601,324 B1
(45) Date of Patent: Oct. 13, 2009

(54) METHOD FOR SYNTHESIZING METAL OXIDE

(75) Inventor: Saleh I. Al-Quraishi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 12/216,835

(22) Filed: Jul. 11, 2008

(51) Int. Cl.
*B23B 5/16* (2006.01)
*C01F 7/42* (2006.01)

(52) U.S. Cl. .............. 423/592.1; 423/625; 423/593; 423/617; 423/622; 423/623; 428/546; 428/402; 422/21; 422/186.04; 75/345; 75/362

(58) Field of Classification Search ........... 423/592.1, 423/617, 622, 623, 593.1, 625; 75/345, 362; 428/402, 404; 422/21, 186.04
See application file for complete search history.

(56) References Cited

U.S. PATENT DOCUMENTS

| | | | |
|---|---|---|---|
| 4,753,675 A | 6/1988 | Ovshinsky et al. | |
| 4,943,316 A | 7/1990 | Taylor | |
| 5,420,401 A | 5/1995 | Jacquault et al. | |
| 5,462,009 A * | 10/1995 | Garrigus | 117/7 |
| 5,652,192 A | 7/1997 | Matson et al. | |
| 5,728,195 A * | 3/1998 | Eastman et al. | 75/351 |
| 5,736,092 A | 4/1998 | Apte et al. | |
| 5,759,230 A | 6/1998 | Chow et al. | |
| 5,886,326 A * | 3/1999 | Tang | 219/679 |
| 6,232,264 B1 | 5/2001 | Lukehart et al. | |
| 6,280,802 B1 * | 8/2001 | Akedo et al. | 427/561 |
| 6,387,494 B1 | 5/2002 | Yanagida et al. | |
| 6,416,862 B1 * | 7/2002 | Kogoi et al. | 428/402 |
| 6,501,059 B1 | 12/2002 | Mast | |
| 6,569,397 B1 * | 5/2003 | Yadav et al. | 423/345 |
| 6,833,019 B1 | 12/2004 | Lewis, III et al. | |
| 7,033,416 B2 | 4/2006 | Kurihara et al. | |
| 7,084,408 B1 * | 8/2006 | Kimball et al. | 250/424 |
| 7,087,100 B2 * | 8/2006 | Lewis et al. | 75/362 |
| 7,211,236 B2 | 5/2007 | Stark et al. | |
| 7,423,512 B1 * | 9/2008 | Reitz et al. | 338/21 |
| 2003/0108683 A1 * | 6/2003 | Wu | 427/580 |

(Continued)

FOREIGN PATENT DOCUMENTS

CA 2466765 A1 5/2003

(Continued)

OTHER PUBLICATIONS

Strucken (93rd annual meeting and exposition of the American Ceramic Society).*

(Continued)

*Primary Examiner*—Melvin C Mayes
*Assistant Examiner*—Jun Li
(74) *Attorney, Agent, or Firm*—Richard C. Litman

(57) ABSTRACT

The method for synthesizing metal oxide nanopowder produces powders of nanoparticle size from metals having relatively low boiling temperatures, such as zinc, tellurium, bismuth, and strontium by vapor-phase oxidation using a conventional 2.45 GHz microwave oven. The energy that initiates the combustion comes from the microwave through a susceptor tube that absorbs radiant microwave energy and transfers it to the metal, which evaporates to small particles inside the susceptor tube and then combusts in air to form nanosize powder. The susceptor is made of silicon carbide composite material.

12 Claims, 2 Drawing Sheets

U.S. PATENT DOCUMENTS

| | | |
|---|---|---|
| 2003/0143153 A1 | 7/2003 | Boulos et al. |
| 2003/0145681 A1 | 8/2003 | El-Shall et al. |
| 2004/0009118 A1* | 1/2004 | Phillips et al. ........... 423/592.1 |
| 2004/0025635 A1 | 2/2004 | Kurihara et al. |
| 2004/0255721 A1 | 12/2004 | Lewis, III et al. |
| 2005/0000950 A1 | 1/2005 | Schroder et al. |
| 2005/0109159 A1 | 5/2005 | Kim et al. |
| 2005/0142059 A1 | 6/2005 | Kim et al. |
| 2007/0101824 A1 | 5/2007 | Drzal et al. |
| 2007/0231234 A1 | 10/2007 | Ravi et al. |
| 2007/0266825 A1* | 11/2007 | Ripley et al. ................. 75/330 |
| 2008/0274042 A1* | 11/2008 | Wira et al. .................. 423/623 |

FOREIGN PATENT DOCUMENTS

| | | | |
|---|---|---|---|
| JP | 4-336423 | | 11/1992 |
| WO | WO93/16571 | * | 8/1993 |
| WO | WO 00/00311 | | 1/2000 |

OTHER PUBLICATIONS

Heuser (Journal of Materials Science, 2007, 42:9057-9062).*
Brooks et al Plasma-promoted dielectric heating in the microwage synthesis of spinels, Chem. Commun., 2005, 4857-4859.*

* cited by examiner

METHOD FOR SYNTHESIZING METAL OXIDE

BACKGROUND OF THE INVENTION

1. Field of the Invention

The present invention relates to the synthesis of metal oxide nanopowders, and more specifically to a method of synthesizing metal oxide nanopowders by rapid microwave combustion.

2. Description of the Related Art

Nanoparticles, including nanopowders, nanoclusters and nanocrystals, are small particles that have at least one dimension less than 100 nm. Nanoparticle research is currently an intense area of scientific research due to a wide variety of potential applications in the biomedical, optical and electronic fields.

Nanoparticles are effectively a bridge between bulk materials and atomic or molecular structures. A bulk material should have constant physical properties regardless of its size, but at the nanoscale level this is often not the case. Size-dependent properties are observed, such as quantum confinement in semiconductor particles, surface plasmon resonance in some metal particles, and superparamagnetism in magnetic materials.

The properties of materials change as their size approaches the nanoscale and as the percentage of atoms at the surface of a material becomes significant. For bulk materials larger than one micrometer, the percentage of atoms at the surface is minuscule relative to the total number of atoms of the material. The interesting and sometimes unexpected properties of nanoparticles are partly due to the aspects of the surface of the material dominating the properties in lieu of the bulk properties.

There are several methods for creating nanoparticles. Attrition and pyrolysis are common methods. In attrition, macro- or microscale particles are ground in a ball mill, a planetary ball mill, or other size-reducing mechanism. The method is simple and inexpensive, but can produce a broad particle size distribution, and the milling tool can possibly introduce contamination into the nanopowder.

In pyrolysis, a liquid or gas organic precursor is forced through an orifice at high pressure and burned. The resulting ash is air classified to recover the metal oxide nanoparticles. In the liquid phase method, nanoparticles are produced from a mixture of chemicals that react when heated to a certain temperature. The liquid phase method is effective, but there are additional costs resulting from the use of solvents and the production of large amounts of wastewater.

Gas phase synthesis methods are used extensively in industry to produce nanopowder metal oxide. These methods usually use supersaturated gases that are unstable relative to the formation of the solid material in nanoparticulate form. These methods can be classified by the phase of the precursor and the energy source used. The precursor could be in the solid, liquid or vapor phase. Conventional heating, solar energy, and laser or electromagnetic radiation energy can usually achieve conversion of the phase of the precursor from solid or liquid to gas phase.

A thermal plasma can also deliver the energy necessary to cause evaporation of small micrometer-size particles. The thermal plasma temperatures are in the order of 10,000K, so that the solid powder easily evaporates. Nanoparticles are formed upon cooling while exiting the plasma region. The main types of thermal plasma torches used to produce nanoparticles are dc plasma jet, dc arc plasma, and radio frequency (RF) induction plasmas. In the arc plasma reactors, the energy necessary for evaporation and reaction is provided by an electric arc that forms between the anode and the cathode. In RF induction plasma torches, energy coupling to the plasma is accomplished through the electromagnetic field generated by the induction coil. The plasma gas does not come in contact with electrodes, thus eliminating possible sources of contamination and allowing the operation of such plasma torches with a wide range of gases, including inert, reducing, oxidizing and other corrosive atmospheres. The working frequency is typically between 200 kHz and 40 MHz. Laboratory units run at power levels in the order of 30-50 kW, while the large-scale industrial units have been tested at power levels up to 1 MW. The RF plasma method has been used to synthesize different nanoparticle materials, for example, synthesis of various ceramic nanoparticles, such as oxides, carbours/carbides, and nitrides of Ti and Si.

None of the above methods, taken either singly or in combination, is seen to describe the instant invention as claimed. Thus, a method for synthesizing metal oxide solving the aforementioned problems is desired.

SUMMARY OF THE INVENTION

The method for synthesizing metal oxide provides a method for producing metal oxide nanoparticles by subjecting low boiling point metals or a combination of low boiling point metals to microwave energy from a conventional 2.45 GHz microwave oven.

The microwave energy is transferred to the metal as heat through the use of a microwave susceptor. Inside the susceptor, the metal will absorb the heat and evaporate into small particles. The small particles then combust in air, forming nanosize powder.

Increasing the length of the susceptor tube and controlling the amount of metal inserted inside the tube can control the size of the nanoparticle. The method can also be used for doping the nanopowder with other metals, such as Ni, Cu, Al, Sn, Zn, In, Te and Bi.

The susceptor is an open-ended tube that is made of silicon carbide (SiC) composite material. The composite is very stable and will not chemically interact with the metal at the elevated temperatures produced inside the susceptor tube. The susceptor has microwave-transparent thermal shielding. The metal is placed into the susceptor tube and then placed inside a conventional microwave oven. This method can produce large quantities of nanopowder quickly and inexpensively.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates generally to the synthesis of metal oxide nanopowders, and more particularly to a method for synthesizing metal oxide nanopowders by rapid microwave combustion.

Figure 1:
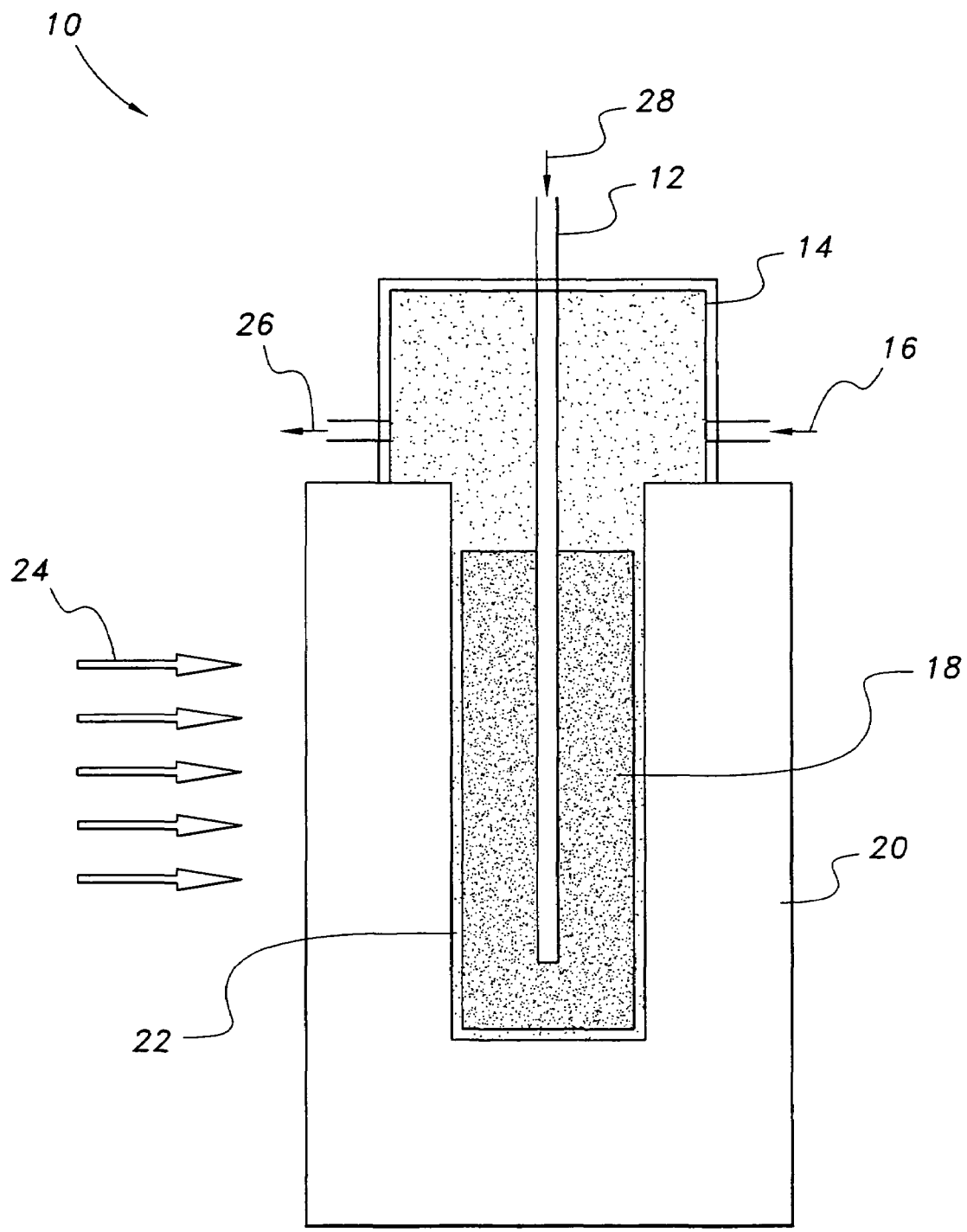
FIG. 1 schematically illustrates an apparatus for practicing a method for synthesizing metal oxide according to the present invention.

FIG. 1 schematically illustrates an apparatus 10 for producing controlled size metal oxide nanopowders using rapid microwave combustion. The microwave energy that initiates the combustion comes from a 2.45 GHz microwave oven. The microwave energy 24 is absorbed by a susceptor 18, and converted into heat. The susceptor 18 is a tube with an open end, the tube being composed of a silicon carbide (SiC) composite or similar ceramic material that is stable and does not interact with the subject metals at the high temperatures reached by the susceptor 18. A thermal shield 20, made of a material transparent to microwaves, insulates the susceptor 18 and prevents the heat from the susceptor 18 from being transferred to the interior of the microwave oven.

The temperature is monitored with a thermocouple 22, and the susceptor 18 is heated to a temperature above the boiling point of the subject metal, usually above 700° C. The subject metal (such as Zn, Bi, Te and Sr), which has a low boiling point, is placed into the susceptor tube 18 by passing the metal through a ceramic inlet tube 12. The metal boils on contact with the interior of the susceptor tube 18 and is converted into vapor. The high temperature vapor combusts with any residual air in the susceptor tube 18, forming a metal oxide vapor. A flow of nitrogen or argon 28 may be used to replace the residual air in the susceptor tube 18 to control the rate of combustion of the vapor.

As the metal boils in the susceptor tube 18, the resulting high temperature vapor rises and comes into contact with the residual air, or with oxygen brought into the susceptor tube 18 through a port 16 by a pump 26. The reaction of the metal with the oxygen produces metal oxide, which continues to rise in the susceptor tube 18. The vapor droplet size decreases as the vapor travels farther up the susceptor tube 18, resulting in smaller particles of nanopowder. Increasing the length of the susceptor tube 18 can control the size of the nanoparticles. The metal oxide vapor exits the tube 18 and condenses as nanopowder on the interior surface of the collecting device 14. Scanning electron microscopy (SEM) and x-ray diffraction (XRD) techniques may then characterize the nanopowder.

The method is further illustrated by the following example.

Example 1

This example describes one process for producing ZnO nanopowder using the microwave rapid combustion method.

Figure 2:
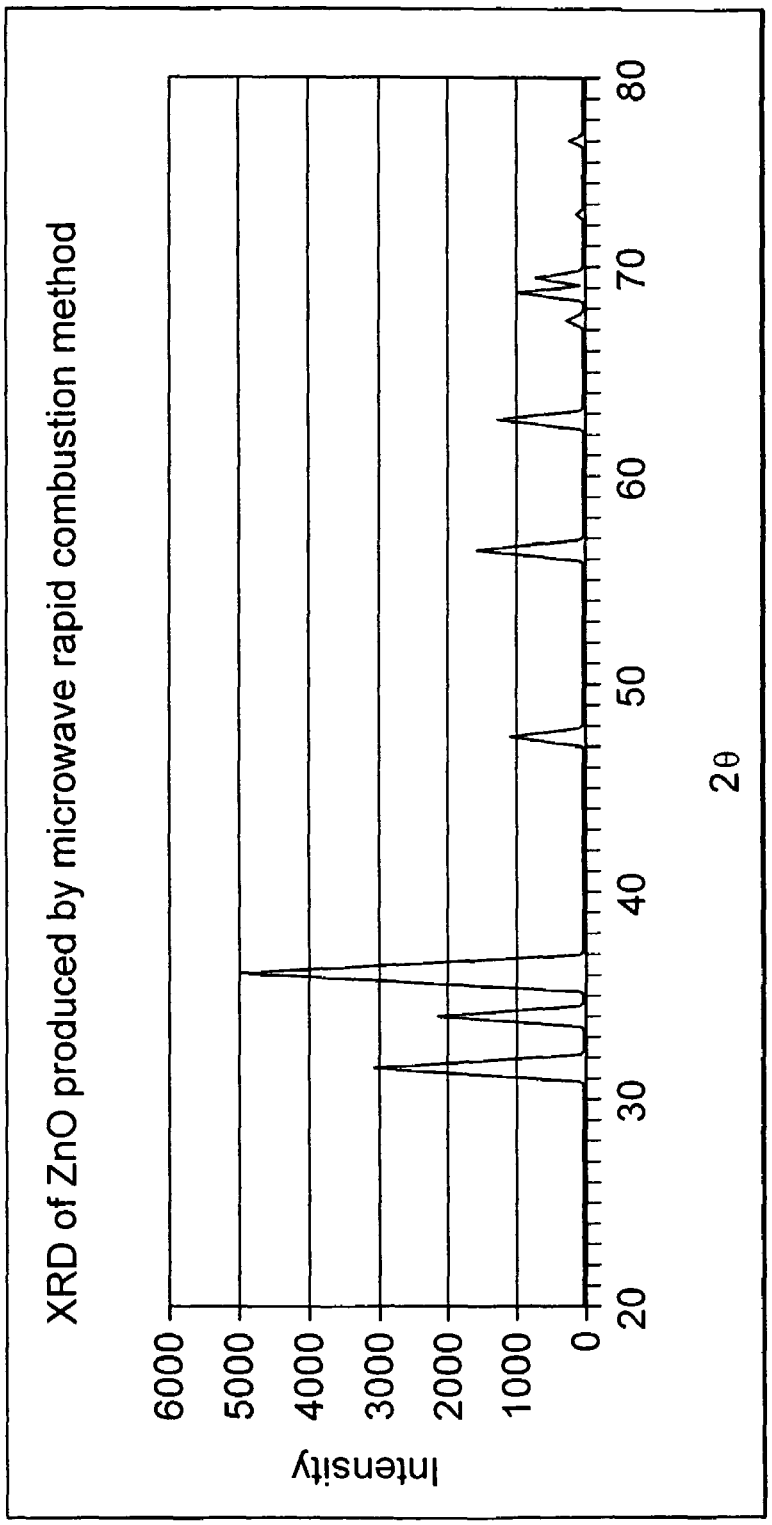
FIG. 2 is an x-ray diffraction pattern of ZnO nanopowder produced by the method for synthesizing metal oxide according to the present invention.

The susceptor tube was placed into the thermal shielding and placed in the interior of a conventional 1.5 kW microwave oven. The oven was started and the temperature of the susceptor tube was monitored with a thermocouple. After approximately four minutes, the temperature of the susceptor tube was 700° C. A 2-gram quantity of zinc (Zn) was inserted through the ceramic inlet tube. After 15 seconds, the Zn evaporated and interacted with the residual oxygen inside the susceptor tube. The resulting combustion formed zinc oxide (ZnO) vapor. The vapor exited from the susceptor tube and interacted with the air to condense as ZnO nanopowder. The nanopowder deposited on the interior surface of the collecting device, which, for this example, was an ordinary beaker. The nanopowder was collected and characterized. FIG. 2 is an x-ray diffraction (XRD) pattern of the ZnO nanopowder produced in this example.

It is to be understood that the present invention is not limited to the embodiment described above, but encompasses any and all embodiments within the scope of the following claims.

I claim:

1. A method for synthesizing metal oxide nanopowder, comprising the steps of:
   heating a susceptor tube to a temperature above the boiling point of a metal;
   inserting the metal into the susceptor tube;
   boiling the metal upon the metal contacting an inner surface of the susceptor tube to form a metal vapor;
   oxidizing the metal vapor to form a metal oxide vapor; and
   collecting an oxide nanopowder of the metal from walls of a collecting chamber disposed over the susceptor tube, the metal oxide vapor formed in the susceptor tube having condensed on the walls of the collection chamber.

2. The method for synthesizing metal oxide nanopowder according to claim 1, wherein the step of heating the susceptor tube comprises the step of irradiating the susceptor tube with microwave radiation in a microwave oven.

3. The method for synthesizing metal oxide nanopowder according to claim 1, wherein the metal has a low boiling point.

4. The method for synthesizing metal oxide nanopowder according to claim 1, wherein the step of inserting the metal comprises the steps of:
   selecting a quantity of metal selected from the group consisting of tellurium, strontium, bismuth and zinc; and
   inserting the quantity into the susceptor tube.

5. The method for synthesizing metal oxide nanopowder according to claim 1, wherein the susceptor tube is made of a silicon carbide-based ceramic.

6. The method for synthesizing metal oxide nanopowder according to claim 1, further comprising the step of replacing residual air in the susceptor tube with an inert gas selected from the group consisting of nitrogen and argon in order to control the rate of reaction.

7. A method for synthesizing metal oxide nanopowder, comprising the steps of:
   heating a susceptor tube to a temperature above the boiling point of a metal;
   inserting the metal into the susceptor tube;
   boiling the metal upon the metal contacting an inner surface of the susceptor tube to form a metal vapor;
   oxidizing the metal vapor with residual air in the susceptor tube to form a metal oxide vapor;
   replacing the residual air in the susceptor tube with an inert gas in order to control the rate of reaction;
   collecting an oxide nanopowder of the metal from walls of a collecting chamber disposed over the susceptor tube, the metal oxide vapor formed in the susceptor tube having condensed on the walls of the collection chamber.

8. The method for synthesizing metal oxide nanopowder according to claim 7, wherein the step of heating the susceptor tube comprises the step of irradiating the susceptor tube with microwave radiation in a microwave oven.

9. The method for synthesizing metal oxide nanopowder according to claim 7, wherein the metal has a low boiling point.

10. The method for synthesizing metal oxide nanopowder according to claim 7, wherein the step of inserting the metal comprises the steps of:

selecting a quantity of metal selected from the group consisting of tellurium, strontium, bismuth and zinc; and inserting the quantity into the susceptor tube.

11. The method for synthesizing metal oxide nanopowder according to claim 7, wherein the susceptor tube is made of a silicon carbide-based ceramic.

12. The method for synthesizing metal oxide nanopowder according to claim 7, wherein the inert gas is selected from the group consisting of argon and nitrogen.

* * * * *